United States Patent
Zaks et al.

(10) Patent No.: US 10,140,210 B2
(45) Date of Patent: Nov. 27, 2018

(54) METHOD AND APPARATUS FOR CACHE OCCUPANCY DETERMINATION AND INSTRUCTION SCHEDULING

(71) Applicant: Intel Corporation, Santa Clara, CA (US)

(72) Inventors: Ayal Zaks, DN Misgav (IL); Robert Valentine, Kiryat Tivon (IL); Arie Narkis, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 14/035,231

(22) Filed: Sep. 24, 2013

(65) Prior Publication Data
US 2015/0089139 A1    Mar. 26, 2015

(51) Int. Cl.
*G06F 12/00*    (2006.01)
*G06F 12/0811*    (2016.01)
(Continued)

(52) U.S. Cl.
CPC ...... *G06F 12/0811* (2013.01); *G06F 9/30047* (2013.01); *G06F 9/383* (2013.01);
(Continued)

(58) Field of Classification Search
CPC .. G06F 9/30047; G06F 9/383; G06F 12/0888; G06F 12/084; G06F 2212/502; G06F 2212/1016; G06F 12/0811
See application file for complete search history.

(56) References Cited

U.S. PATENT DOCUMENTS 5,724,586 A * 3/1998 Edler ............... G06F 9/4881
                                                    718/102
5,943,691 A * 8/1999 Wallace ............ G06F 8/4442
                                                    711/118
(Continued)

FOREIGN PATENT DOCUMENTS

CN          1849591 A      10/2006
EP          0919923 A2     6/1999
(Continued)

OTHER PUBLICATIONS

International Preliminary Report on Patentability for International Application No. PCT/US2014/054491, dated Mar. 29, 2016, 6 pages.
(Continued)

*Primary Examiner* — Francisco A Grullon
(74) *Attorney, Agent, or Firm* — Nicholson De Vos Webster & Elliott LLP

(57) ABSTRACT

An apparatus and method for determining whether data needed for one or more operations is stored in a cache and scheduling the operations for execution based on the determination. For example, one embodiment of a processor comprises: a hierarchy of cache levels for caching data including at least a level 1 (L1) cache; cache occupancy determination logic to determine whether data associated with one or more subsequent operations is stored in one of the cache levels; and scheduling logic to schedule execution of the subsequent operations based on the determination of whether data associated with the subsequent operations is stored in the cache levels.

15 Claims, 10 Drawing Sheets

(51) Int. Cl.

| | | |
|---|---|---|
| *G06F 12/084* | (2016.01) | |
| *G06F 9/30* | (2018.01) | |
| *G06F 9/38* | (2018.01) | |
| *G06F 12/08* | (2016.01) | |
| *G06F 12/0842* | (2016.01) | |
| *G06F 12/0855* | (2016.01) | |
| *G06F 12/0862* | (2016.01) | |
| *G06F 12/0875* | (2016.01) | |
| *G06F 12/0897* | (2016.01) | |
| *G06F 12/0888* | (2016.01) | |

(52) U.S. Cl.
CPC ........... *G06F 12/08* (2013.01); *G06F 12/084* (2013.01); *G06F 12/0842* (2013.01); *G06F 12/0855* (2013.01); *G06F 12/0862* (2013.01); *G06F 12/0875* (2013.01); *G06F 12/0897* (2013.01); *G06F 12/0888* (2013.01); *G06F 2212/1016* (2013.01); *G06F 2212/502* (2013.01)

(56) References Cited

U.S. PATENT DOCUMENTS

| | | | | |
|---|---|---|---|---|
| 6,073,230 | A * | 6/2000 | Pickett | G06F 9/3806 |
| | | | | 711/E12.018 |
| 6,996,821 | B1 | 2/2006 | Butterworth | |
| 7,392,340 | B1 * | 6/2008 | Dang | G06F 12/0871 |
| | | | | 711/111 |
| 7,430,642 | B2 * | 9/2008 | Moyer | G06F 9/3802 |
| | | | | 711/128 |
| 7,447,879 | B2 | 11/2008 | Luick | |
| 8,392,651 | B2 * | 3/2013 | Mylavarapu | G06F 1/3203 |
| | | | | 711/108 |
| 2005/0125632 | A1 * | 6/2005 | Alsup | G06F 9/3802 |
| | | | | 712/207 |
| 2008/0109817 | A1 | 5/2008 | Nakamura | |
| 2008/0134184 | A1 * | 6/2008 | Fedorova | G06F 9/4881 |
| | | | | 718/102 |
| 2009/0055829 | A1 * | 2/2009 | Gibson | G06F 9/4881 |
| | | | | 718/103 |
| 2009/0138661 | A1 * | 5/2009 | Lauterbach | G06F 9/30047 |
| | | | | 711/137 |
| 2010/0095300 | A1 * | 4/2010 | West | G06F 9/5016 |
| | | | | 718/104 |
| 2011/0055479 | A1 * | 3/2011 | West | G06F 9/4881 |
| | | | | 711/118 |
| 2011/0072213 | A1 | 3/2011 | Nickolls et al. | |
| 2011/0072218 | A1 * | 3/2011 | Manne | G06F 12/0862 |
| | | | | 711/136 |
| 2011/0231857 | A1 * | 9/2011 | Zaroo | G06F 9/4881 |
| | | | | 718/104 |
| 2011/0238919 | A1 * | 9/2011 | Gibson | G06F 12/084 |
| | | | | 711/133 |
| 2013/0232500 | A1 | 9/2013 | Zaroo et al. | |
| 2014/0337605 | A1 * | 11/2014 | Hall | G06F 9/3806 |
| | | | | 712/239 |

FOREIGN PATENT DOCUMENTS

| | | |
|---|---|---|
| EP | 1622003 A1 | 2/2006 |
| JP | H1091455 A | 4/1998 |
| JP | H11288373 A | 10/1999 |
| JP | 2010026583 A | 2/2010 |
| JP | 2011150691 A | 8/2011 |
| TW | 200809501 A | 2/2008 |
| TW | 200821924 A | 5/2008 |
| TW | I363992 B | 5/2012 |
| TW | 201337750 A | 9/2013 |
| WO | 02069150 A1 | 9/2002 |

OTHER PUBLICATIONS

International Search Report and Written Opinion for International Application No. PCT/US2014/054491, dated Dec. 30, 2014, 8 pages.
Notice of Allowance from foreign counterpart Taiwan Patent Application No. TW103130266, dated Feb. 15, 2016, 4 pages.
Office Action from foreign counterpart Korean Patent Application No. 1020167004467, dated Oct. 20, 2016, 8 pages.
Notice of Allowance from foreign counterpart Korean Patent Application No. 1020167004467, dated Aug. 28, 2017, 3 pages.
Notification of Reasons for Refusal from foreign counterpart Japanese Application No. 2016-542028, dated Mar. 14, 2017, 14 pages.
Extended European Search Report for Application No. 14849028.7, dated May 26, 2017, 12 pages.
Notice of Final Rejection from foreign counterpart Korean Patent Application No. 10-2016-7004467, dated May 11, 2017, 5 pages.
Notification of Reasons for Refusal from foreign counterpart Japanese Application No. 2016-542028, dated Feb. 6, 2018, 5 pages.
Decision to Grant a patent from foreign counterpart Japanese Patent Application No. 2016-542028, dated May 22, 2018, 3 pages.
First Office Action and Search Report from foreign counterpart Chinese Patent Application No. CN201480046896.5, dated Apr. 3, 2018, 26 pages.

\* cited by examiner

METHOD AND APPARATUS FOR CACHE OCCUPANCY DETERMINATION AND INSTRUCTION SCHEDULING

BACKGROUND

Field of the Invention

This invention relates generally to the field of computer processors. More particularly, the invention relates to an apparatus and method for cache occupancy determination and instruction scheduling.

Description of the Related Art

Data cache misses result in inefficient execution of program code because if the data needed to execute an operation is not stored in a cache, then a considerable amount of time (e.g., microprocessor cycles) must be expended to retrieve the data from memory. One previous solution to this problem is data prefetching where explicit architectural support is provided to anticipate the data which will be needed and to prefetch that data to the cache. Another solution is to use cache-oblivious and cache-aware algorithms that determine how to optimize the layout of data structures in memory, without the use of any special architectural support or interaction.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
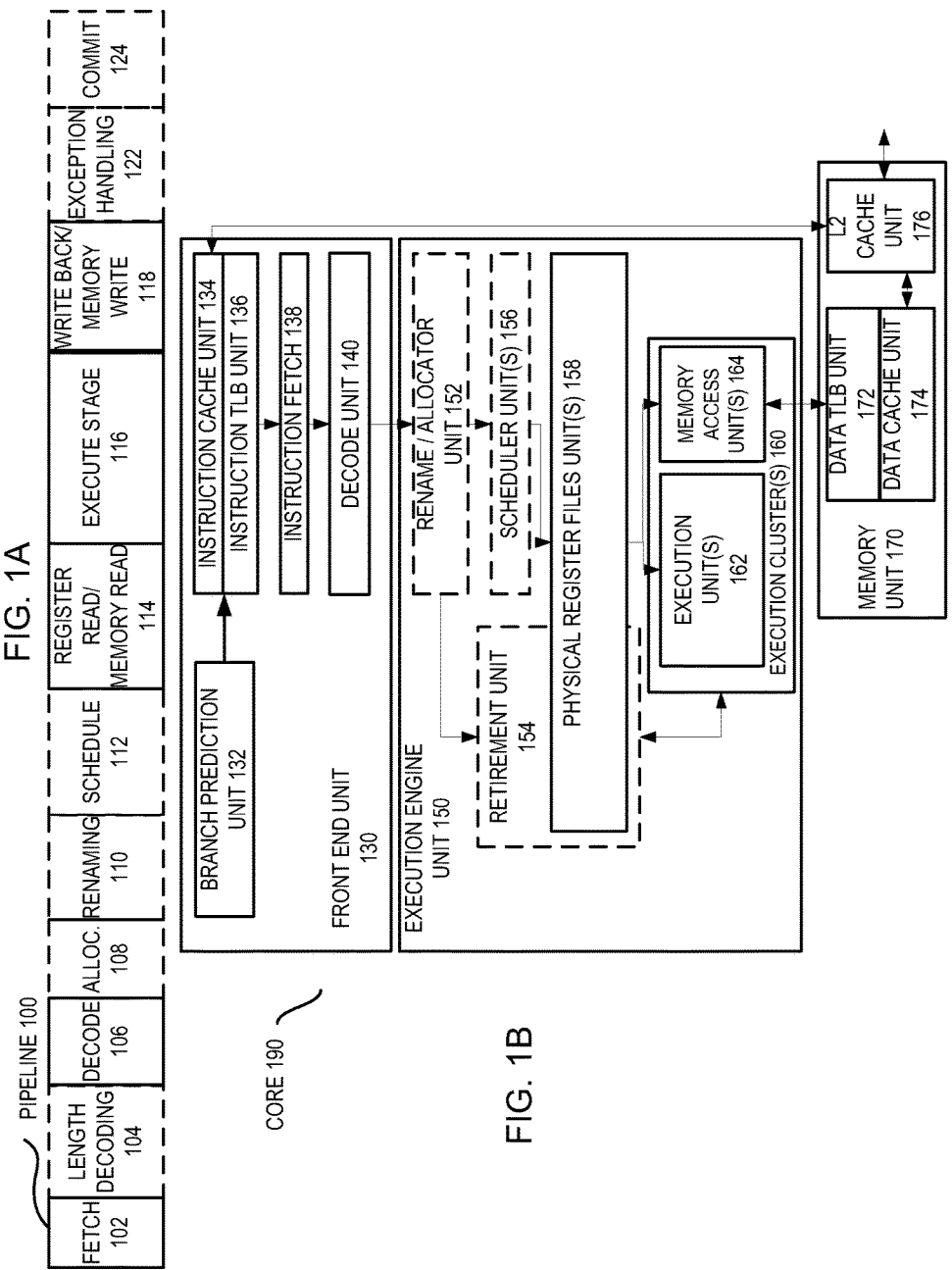
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
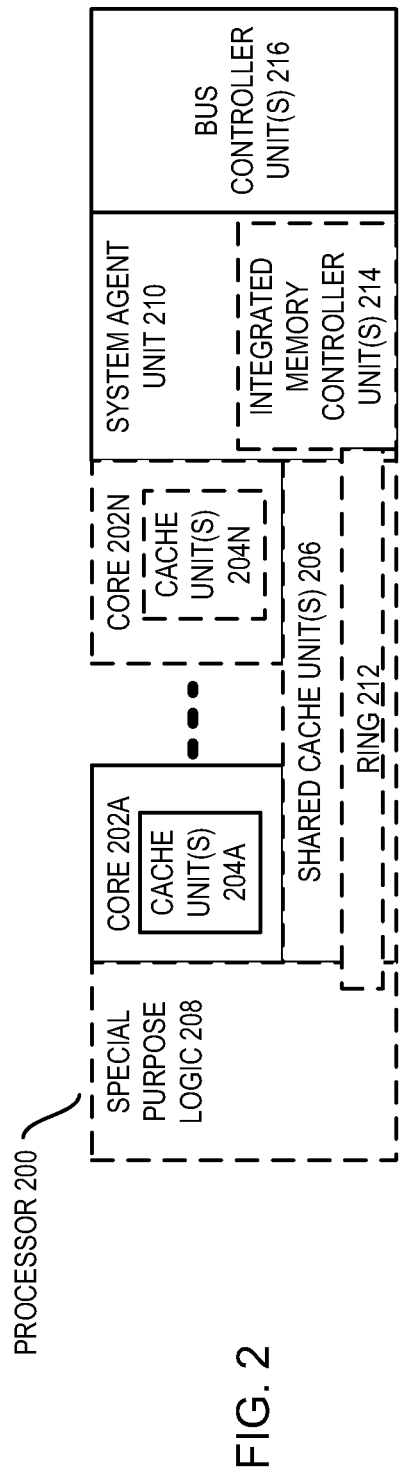
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC)

coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache 204A-N within the cores 202A-N, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
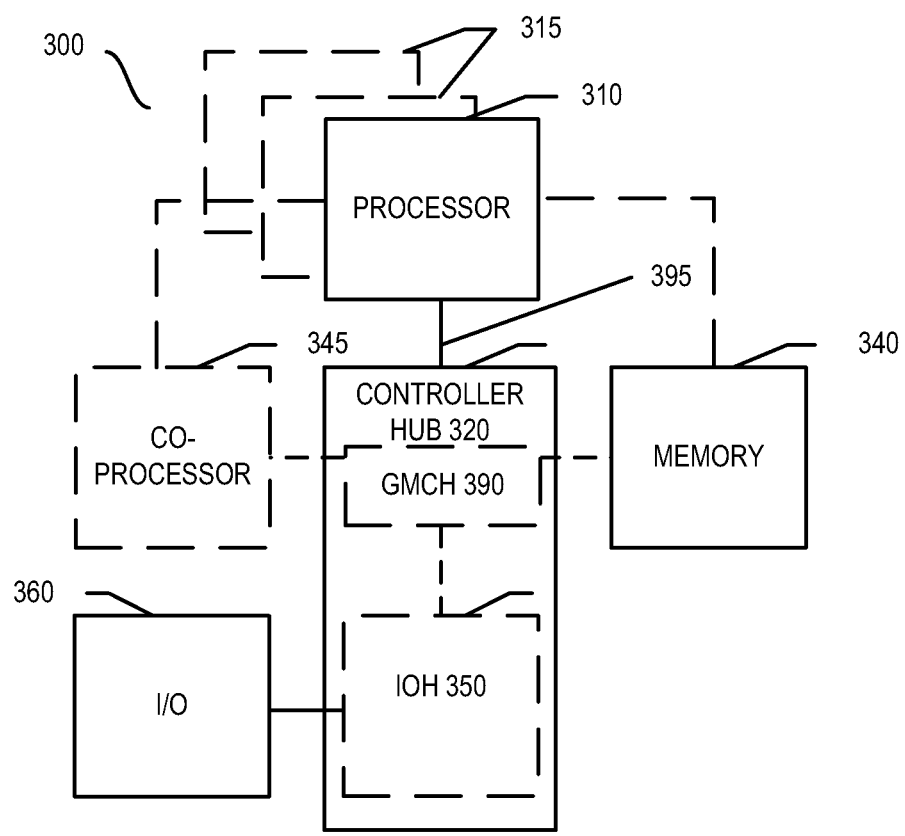
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
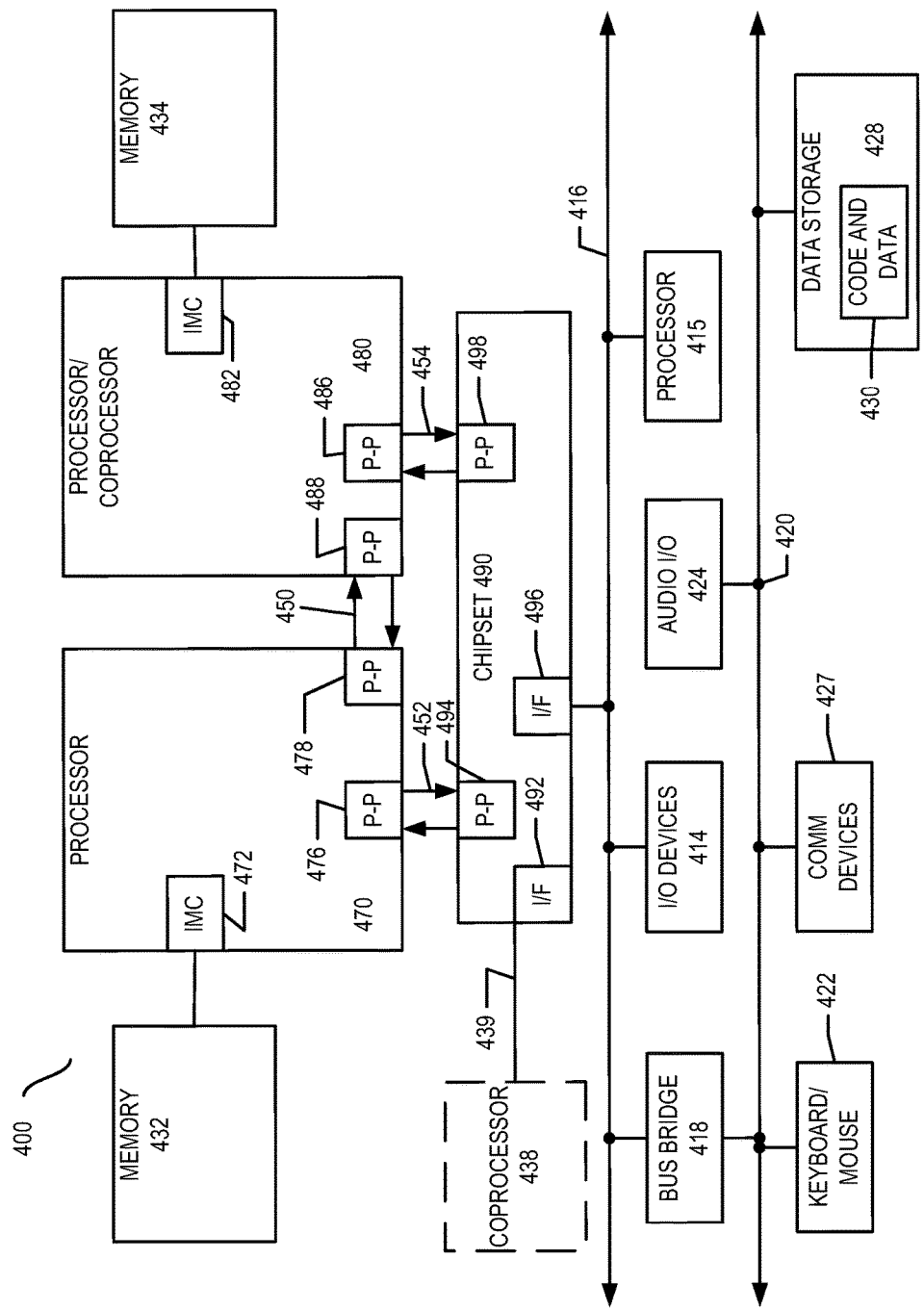
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 492 through connection 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
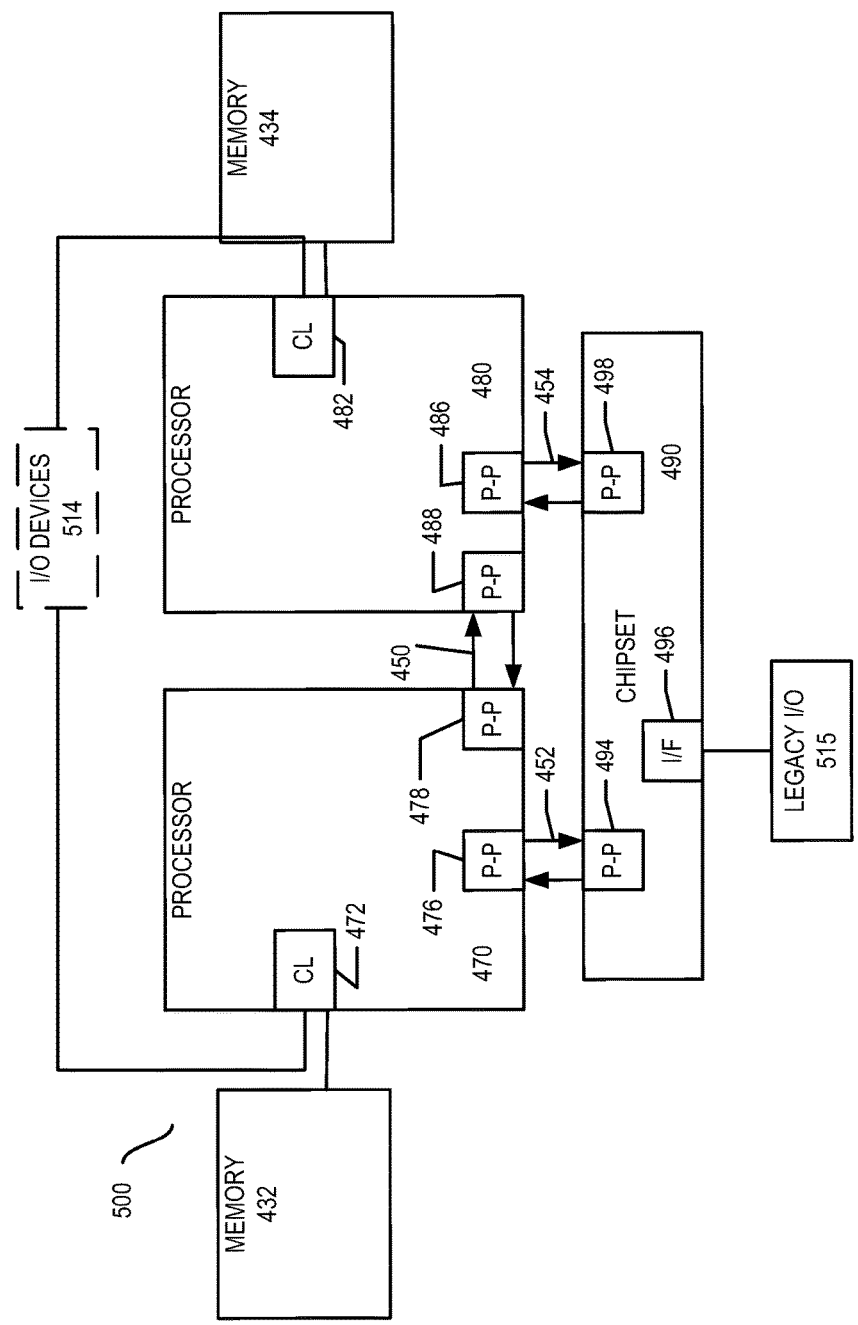
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
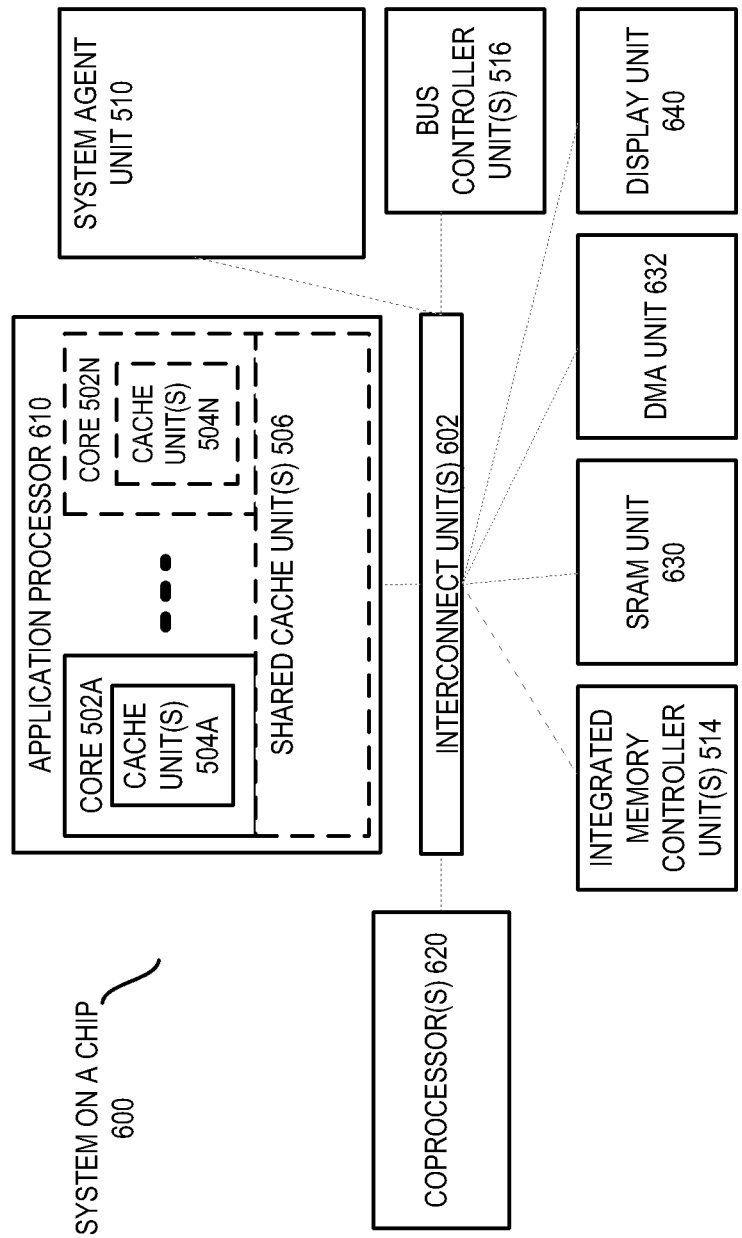
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
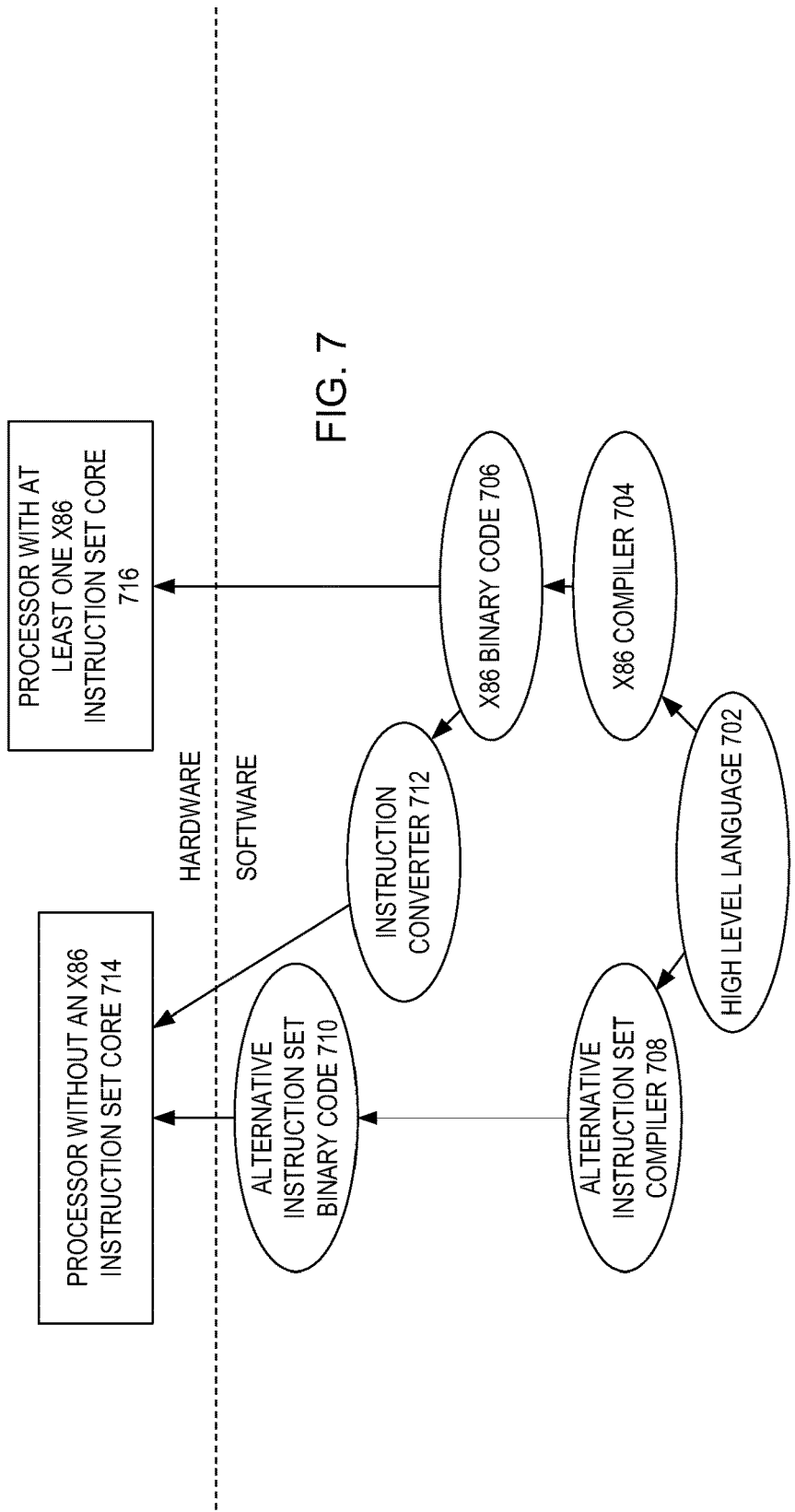
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Cache Occupancy Determination and Instruction Scheduling One embodiment of the invention determines if an item of data is currently stored in a cache using an address associated with the data and schedules one or more subsequent operations (e.g., macroinstructions, micro-operations, etc) based on the determination. The term "scheduling" is used broadly herein to refer to any decision related to if and/or when a particular instruction, micro-operation should be executed; including a decision as to whether a particular portion of work can be reallocated from one thread to another (e.g., when a thread looks to steal work from the work-queues of other threads as described in the example below).

In addition to determining whether data is in a cache, one embodiment may also provide an indication of the particular cache level(s) in which the data is stored (e.g., level 1 (L1), level 2 (L3), lower level cache (LLC), etc); an indication of the anticipated amount of "time" required to access the data (e.g., in processor cycles); and/or an indication as to whether the address is "too far away" according to a specified level of search (e.g., using a threshold number of processor cycles).

One embodiment of the invention may be implemented as an instruction which takes an address as input and provides an indication as to whether the data item identified by the address is currently cached. As discussed in detail below, the results of this instruction may then be used when scheduling subsequent instructions for execution (e.g., selecting those instructions for which addresses are cached).

By way of example, this "cache occupancy determination" instruction may take a form such as:

Incache SRC1, DST1 where the address of the data is stored in source register SRC1 and the results of the determination (i.e., whether the data is cached, what level, expected "time" to access, an indication that the address is "too far away," etc) are written to the destination register DST1.

In one embodiment, the cache occupancy determination instruction is a vector instruction, such as an advanced vector extension (AVX) or AVX2 instruction, which reads multiple addresses from one or more vector source registers (e.g., where a single vector register may store multiple address operands) and writes multiple results to one or more vector destination registers (e.g., where a single vector destination register stores multiple results). It should be noted, however, that the underlying principles of the invention are not limited to a vector implementation.

Figure 8:
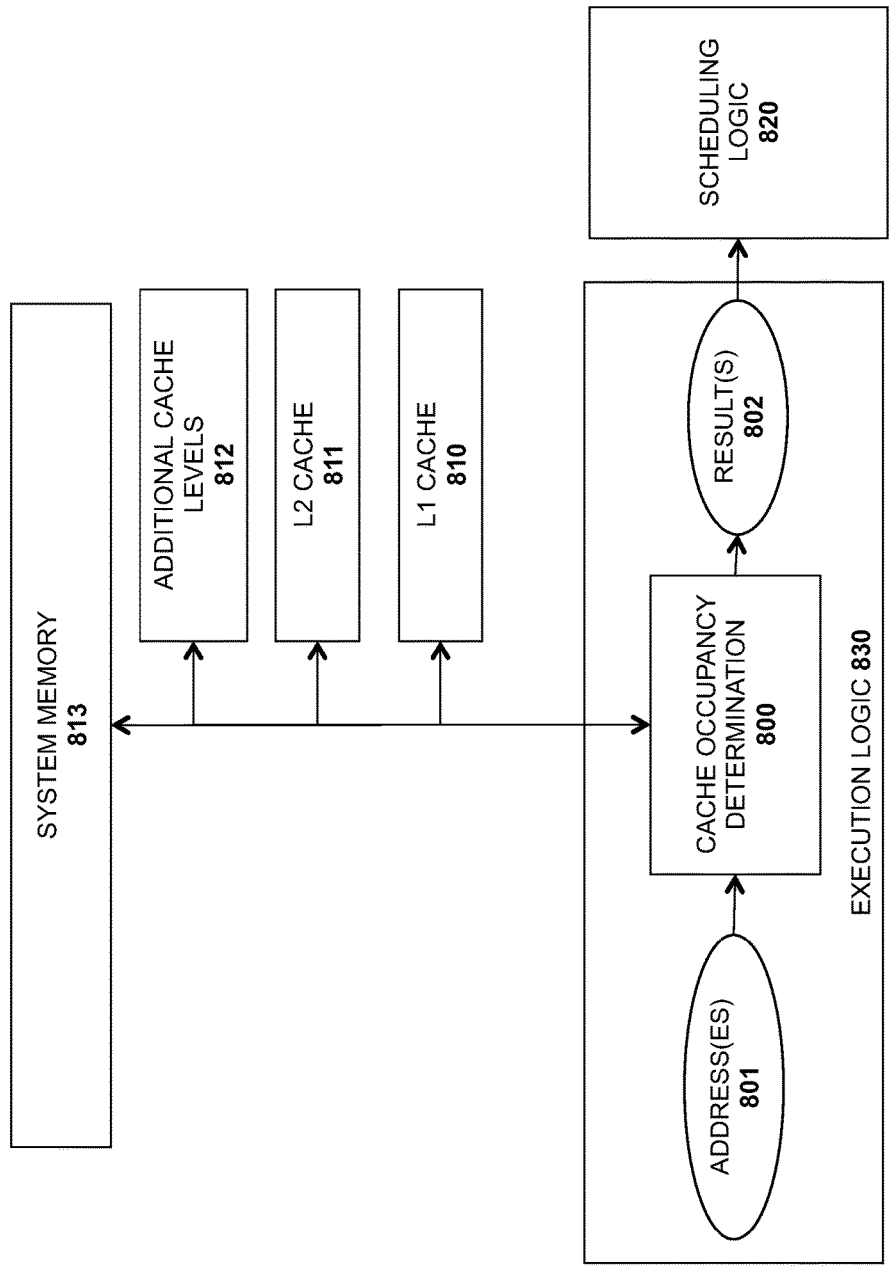
FIG. 8 illustrates one embodiment of an architecture with logic for determining cache occupancy.

As illustrated in FIG. 8, in one embodiment, the execution logic 830 within the processor includes cache occupancy determination logic 800 for performing the cache occupancy determination operations described herein. For example, in response to executing the INCACHE instruction, the cache occupancy determination logic 800 may determine whether one or more addresses 801 are associated with data currently stored in one of the cache levels 810-812. As mentioned above, the results 802 may include this information as well as an indication of the particular cache level(s), the expected time to access (e.g., in processor cycles), and/or an indication whether the address is too far away (e.g., based on a specified threshold of processor cycles). In one embodiment, the determination is done by performing a cache lookup operation using the address(es) (e.g., comparing the address or a portion of the address against existing cache tags).

In one embodiment, once the results 802 are determined, they may be used by scheduling logic 820 for scheduling the execution of subsequent operations. For example, operations with data stored in the L1 cache may be executed first, followed by operations with data stored in the L2 cache, followed by operations further down the cache hierarchy (e.g., store in a lower level cache (LLC) or other lower cache level(s)). Although not specifically shown in FIG. 8, the scheduling logic 820 may be implemented within the instruction decode stage of the processor or core (e.g., within a reservation station, or other scheduling unit).

In one embodiment, the instruction acts as a hint for subsequent operations. The cache line associated with the address may be evicted from the cache after the instruction returns (e.g., by the time the subsequent operation needs the data), rendering its result obsolete. In such cases, only performance will be affected and the address will simply be brought back into the cache using known techniques.

One embodiment of the instruction may try to keep the cache line in the cache 810-812. For example, the lookup performed by the occupancy determination logic 800 may be treated as a use of the cache line (e.g., for a least recently used (LRU) or other eviction policy, or provide an indication how long the line may stay in the cache/how recently it was used) to improve the likelihood that the line is maintained in the cache long enough to be used by a subsequent instruction.

As mentioned, the information provided by the cache occupancy instruction (e.g., whether in a cache, the cache level, etc) may then be used to schedule the execution of subsequent instructions and/or threads. For example, the cache occupancy instruction may enable various types of processes to execute in a more efficient, cache-aware manner, including (but not limited to) work-queue algorithms which cycle around a work-queue, extracting and processing an item of work every iteration, and possibly augmenting the work-queue with additional items in doing so. Where there is concurrency, any item may be picked off of the work-queue and executed. There may or may not be parallelism. In some cases, items may need to be processed one by one (single threaded); in other scenarios, several workers may process distinct items in parallel (see "work-stealing" discussion below).

One embodiment of the invention is used to select the next item from the work queue to process. All things being equal (and ignoring fairness issues), it would benefit performance to choose an item whose data is already in one of the caches (particularly one which is further up the cache hierarchy such as the L1 cache 810). This may be particularly beneficial if the process being executed is memory bound, where it is difficult to predict which addresses will be needed next.

In one embodiment of the invention, a process utilizing the embodiments of the invention scans the work-queue in search for a "cached" item (e.g., utilizing the cache occupancy instruction as described herein), and processes the first one found. Alternatively, or in addition, the process may identify multiple items which are cached and choose the one or more work items which are relatively higher up in the cache hierarchy (e.g., in the L1 cache). If no items are found in a cache, the first item on the work queue is picked and processed (e.g., using standard techniques).

The embodiments of the invention may be particularly applicable when scanning a tree whose nodes are dispersed in memory. In this implementation, each item on the work-queue specifies a pointer to a node. Several such nodes may reside in the same cache line, but in arbitrary order or position. Often, a choice can be made between, for example, a breadth first search (BFS) or depth first search (DFS) traversal of the tree based only on the expected cache behavior, hoping to optimize for spatial locality.

Using the embodiments of the invention, greater precision can be obtained by having the cache guide the scan (as discussed above). Instances of such scans include, for example, traversing a quad/oct-tree to process its leaves in arbitrary order, and mark-and-sweep garbage collectors (i.e., processes which reclaim portions of memory which are no longer in use by a program).

Another example involves work-stealing in parallel execution frameworks such as Thread Building Blocks (TBB), a C++ template library developed by the assignee of the present application for writing software programs that take advantage of multi-core processor. When a thread looks to steal work from the work-queues of other threads, it will prefer to steal work that is already in the stealing thread's cache. Determining whether work is already in the cache can be accomplished using the techniques described herein.

As a concrete example, one embodiment of the invention will be described within the context of the following textbook implementation of a BFS scan (from Wikipedia):

```
Input: A graph G and a root v of G
 1   procedure BFS(G,v):
 2       create a queue Q
 3       enqueue v onto Q
 4       mark v
 5       while Q is not empty:
 6           t ← Q.dequeue( )
 7           if t is what we are looking for:
 8               return t
 9           for all edges e in G.adjacentEdges(t) do
12               u ←G.adjacentVertex(t,e)
13               if u is not marked:
14                   mark u
15                   enqueue u onto Q
```

One embodiment implements line 6 ("t←Q.dequeue( )") by a loop traversing Q, or a limited part of Q, in search for an entry that resides in a cache (e.g., executing the cache occupancy instruction described above). If one is found, it is "dequeued" (possibly from the middle of Q) and returned. If no such entry is found, the first element of Q is dequeued. Note that the search may no longer be breadth-first.

Another application is to check in line 13 to determine if u is in a cache. If so, continue to check its mark, and enqueue it in a "cached" queue. If u is not in a cache, enqueue it in a "non-cached" queue. In one embodiment, work items are executed first from the "cached" queue; when the cached queue is empty, work items are executed from the "non-cached" queue.

Figure 9:
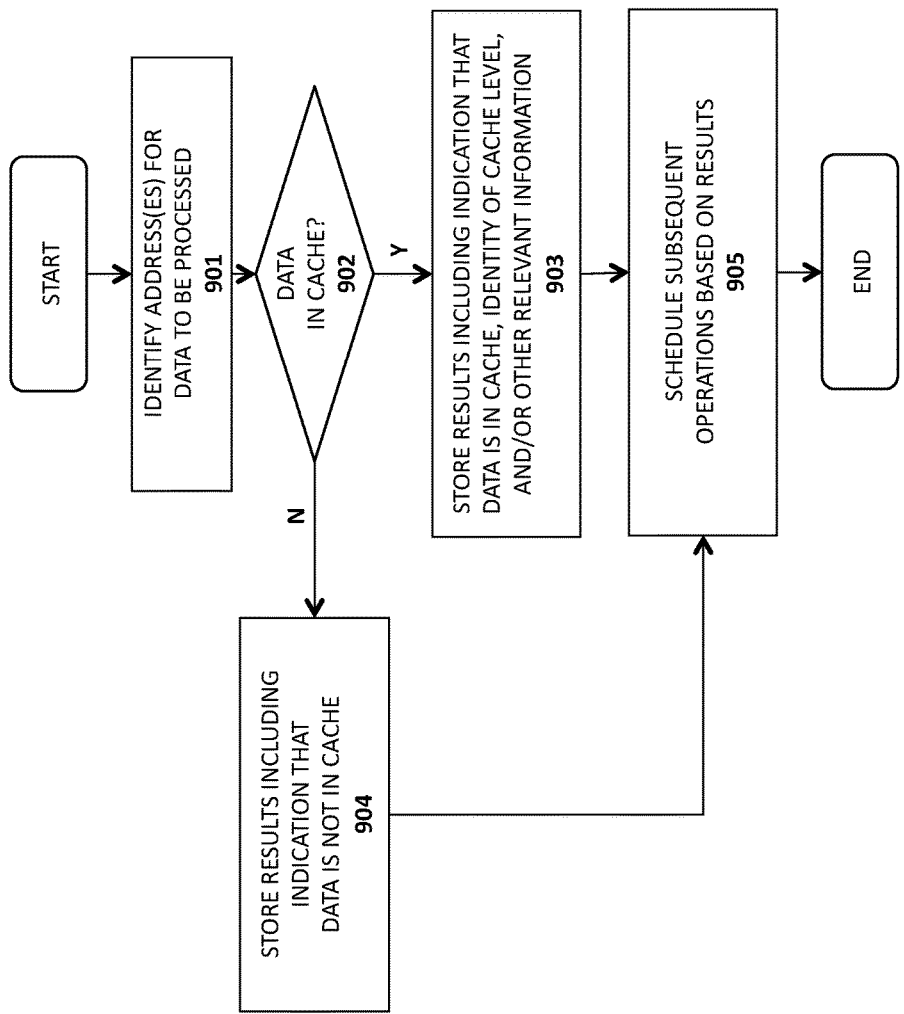
FIG. 9 illustrates one embodiment of a method for determining cache occupancy and executing subsequent operations based on the determination.

One embodiment of a method for determining whether data is stored in a cache is illustrated in FIG. 9. At 901, one or more addresses associated with data to be processed are identified (e.g., as determined from one or more instructions awaiting execution). As previously mentioned, in one embodiment, multiple addresses may be read and processed concurrently (e.g., read from a vector register by a vector instruction). At 902, a determination is made as to whether the data associated with each address is stored in one of the cache levels. If not, then a result is stored indicating that the data is not in the cache at 904 (e.g., in a destination/result register). If so, then at 903, a result is stored indicating that the data is stored in one of the cache levels, potentially along with the identity of the cache level and/or other relevant information (e.g., the expected "time" to access, an indication that the address is "too far away," etc).

At 905, one or more subsequent operations are scheduled based on the results. For example, if none of the data is stored in a cache level, then subsequent operations may be scheduled using existing scheduling techniques. However, if data for one or more of the pending operations is stored in a cache, then these operations may be scheduled for execution ahead of operations which do not have data stored in the cache. In one embodiment, the identity of the cache level(s) in which the data is stored may be used for scheduling. For example, operations with data is stored in the L1 cache may be executed first, followed by operations with data stored in the L2 cache, and then operations further down the cache hierarchy (e.g., store in a lower level cache (LLC) or other lower cache level(s)).

It should be noted that the "operations" being scheduled using the techniques described herein may comprise any form of operations including, for example, macroinstructions or micro-operations. Furthermore, the underlying principles of the invention may be implemented on any type of instruction set architecture including complex instruction set computer (CISC) architectures and reduced instruction set computer (RISC) architectures.

Figure 10:
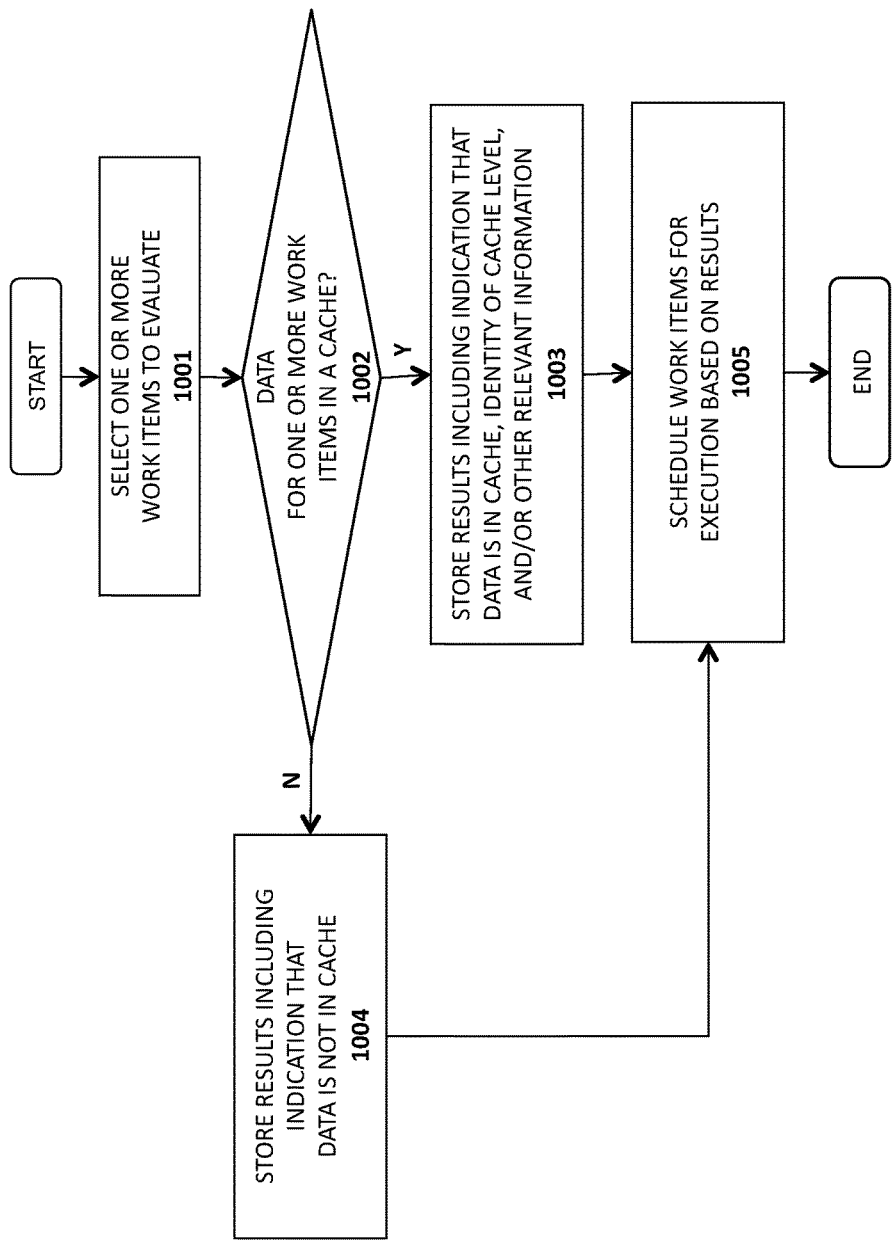
FIG. 10 illustrates one embodiment of a method for determining cache occupancy and executing work items from a work queue based on the determination.

One embodiment of a method for scheduling work items from a work queue based on whether data for each work item is stored in a cache is illustrated in FIG. 10. At 1001, one or more work items are selected for evaluation. As mentioned, each work item may be stored in a work queue pending execution and multiple work items may be evaluated in parallel. At 1002, a determination is made as to whether the data needed to execute the one or more work items is stored in a cache (e.g., using the addresses for the data as discussed above). If not, then at 1004, a result is stored indicating that data is not in a cache and the work items are scheduled using existing techniques at 1005 (e.g., using a BFS scan).

However, if it is determined at 1002 that data for one or more work items is cached, then at 1003, a result is stored indicating that the data is stored in one of the cache levels, potentially along with the identity of the cache level and/or other relevant information (e.g., the expected "time" to access, an indication that the address is "too far away," etc). At 1005, the work items for which data is cached may be scheduled for execution ahead of work items which do not have data stored in a cache. In one embodiment, the identity of the cache level(s) in which the data is stored may be used for scheduling. For example, as in the embodiment shown in FIG. 9, work items with data is stored in the L1 cache may be executed first, followed by work items with data stored in the L2 cache, and then work items further down the cache hierarchy (e.g., store in a lower level cache (LLC) or other lower cache level(s)).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a hierarchy of cache levels for caching data including at least a level 1 (L1) cache;
   a decoder to decode a cache occupancy instruction;
   cache occupancy determination logic to determine whether data associated with one or more subsequent operations is stored in one of the cache levels, the cache occupancy determination logic comprising execution logic to execute the decoded cache occupancy instruction to determine whether data associated with one or more subsequent operations is stored in one of the cache levels, wherein the cache occupancy determination logic is to read one or more addresses associated with the data for the one or more subsequent operations and to use the addresses to determine whether the data is stored in one of the cache levels and the particular cache levels in which the data is stored; and
   scheduling logic to schedule execution of the subsequent operations based on the determination of whether data associated with the subsequent operations is stored in the cache levels.

2. The processor as in claim 1 wherein using the addresses comprises performing a cache lookup operation with the addresses.

3. The processor as in claim 1 wherein the scheduling logic is to schedule execution of the subsequent operations based on the determination of the particular cache levels in which the data for the subsequent operations is stored.

4. The processor as in claim 3 wherein the scheduling logic schedules operations with data relatively higher in the cache hierarchy ahead of operations with data relatively lower in the cache hierarchy and/or data not in a cache level.

5. The processor as in claim 1 wherein the cache occupancy determination logic is to further determine an expected time to access the data and/or an indication whether the data is too far away based on a specified threshold.

6. The processor as in claim 5 wherein the scheduling logic schedules the subsequent operations based on the determined expected time to access the data and/or an indication whether the data is too far away based on a specified threshold.

7. The processor as in claim 1 wherein the cache levels further include a level 2 (L2) cache and a lower level cache (LLC).

8. A method comprising:
   caching data within a hierarchy of cache levels including at least a level 1 (L1) cache;
   decoding a cache occupancy instruction;

executing the decoded cache occupancy instruction to determine whether data associated with one or more subsequent operations is stored in one of the cache levels, wherein executing the cache occupancy instruction further includes reading one or more addresses associated with the data for the one or more subsequent operations, using the addresses to determine whether the data is stored in one of the cache levels and the particular cache levels in which the data is stored; and scheduling execution of the subsequent operations based on the determination of whether data associated with the subsequent operations is stored in the cache levels.

9. The method as in claim 8 wherein using the addresses comprises performing a cache lookup operation with the addresses.

10. The method as in claim 8 further comprising:
scheduling execution of the subsequent operations based on the determination of the particular cache levels in which the data for the subsequent operations is stored.

11. The method as in claim 10 further comprising:
scheduling operations with data relatively higher in the cache hierarchy ahead of operations with data relatively lower in the cache hierarchy and/or data not in a cache level.

12. The method as in claim 8 further comprising:
determining an expected time to access the data and/or an indication whether the data is too far away based on a specified threshold.

13. The method as in claim 12 further comprising:
scheduling the subsequent operations based on the determined expected time to access the data and/or an indication whether the data is too far away based on a specified threshold.

14. The method as in claim 8 wherein the cache levels further include a level 2 (L2) cache and a lower level cache (LLC).

15. A system comprising:
a memory for storing program code and data;
a input/output (IO) communication interface for communicating with one or more peripheral devices;
a network communication interface for communicatively coupling the system to a network; and
a processor comprising:
a hierarchy of cache levels for caching data including at least a level 1 (L1) cache;
a decoder to decode a cache occupancy instruction;
cache occupancy determination logic to determine whether data associated with one or more subsequent operations is stored in one of the cache levels, the cache occupancy determination logic comprising execution logic to execute the decoded cache occupancy instruction to determine whether data associated with one or more subsequent operations is stored in one of the cache levels, wherein the cache occupancy determination logic is to read one or more addresses associated with the data for the one or more subsequent operations and to use the addresses to determine whether the data is stored in one of the cache levels and the particular cache levels in which the data is stored; and
scheduling logic to schedule execution of the subsequent operations based on the determination of whether data associated with the subsequent operations is stored in the cache levels.

* * * * *